Apr. 17, 1923.

N. EGAN 1,452,366

COLLAPSIBLE ROOST

Filed Jan. 25, 1922

Inventor
Naomi Egan

By Buen + Thomas

Attorney

Patented Apr. 17, 1923.

1,452,366

UNITED STATES PATENT OFFICE.

NAOMI EGAN, OF REDDING, CALIFORNIA.

COLLAPSIBLE ROOST.

Application filed January 25, 1922. Serial No. 531,550.

*To all whom it may concern:*

Be it known that I, NAOMI EGAN, citizen of the United States of America, residing at Redding, in the county of Shasta and State of California, have invented certain new and useful Improvements in Collapsible Roosts, of which the following is a specification.

The invention relates to improvements in chicken roosts.

Heretofore chicken roosts have been largely constructed in such a manner that they are permanent in application, and it is therefore rather difficult to move said roosts, or to provide a roost which will serve emergency purposes.

It is an object of my invention to provide a collapsible chicken roost, that is a roost that is constructed of detachable sections, and may be rapidly set up wherever desired and knocked down with equal ease. The invention has particular application to a collapsible roost which may in certain climates be set up in the open and when not in use very readily taken apart or knocked down.

In the accompanying drawings I have shown a single embodiment of my invention for the purpose of illustrating the same, but it will be understood that the invention is susceptible of many changes and that the present disclosure is merely for the purpose of illustration.

Figure 1:
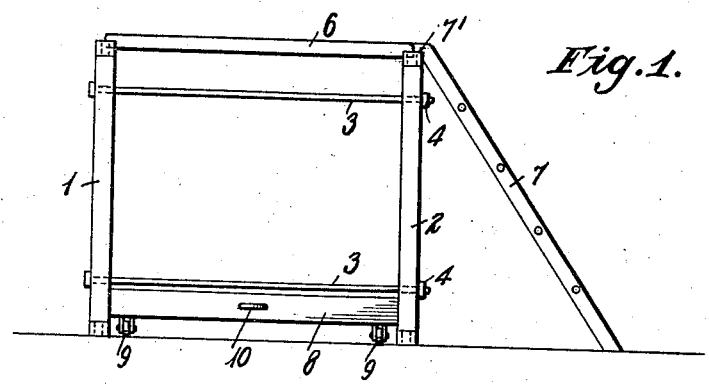
Figure 2:
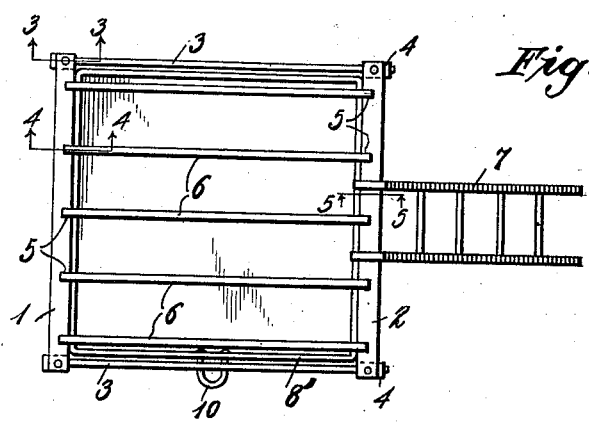
Figure 3:
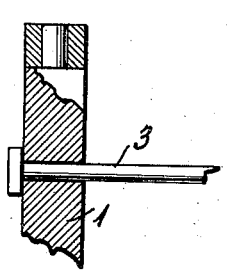
Figure 4:
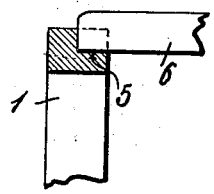
Figure 5:
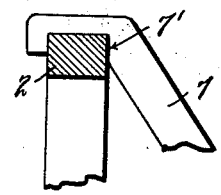

In the drawings, Figure 1 represents a side elevation of the device. Fig. 2 represents a top plan view, and Figs. 3, 4, and 5 are detail views.

Referring now more particularly to the drawings wherein like reference characters indicate corresponding parts, the numerals 1 and 2 designate the side frames of my roost, which may be composed of wood, metal, or any similar material and the sections forming said frames may be united in any desired manner. The two side frames are preferably joined together by cross tie rods 3 having threaded ends receiving the nuts 4 with which the side frames are detachably connected and may be disconnected so that the said frames will occupy little space when the roost is not in use. As many of these tie rods can be employed as is found desirable, and various types of rods can be utilized for serving the desired purpose.

The upper bars of the frames 1 and 2 are provided with a series of sockets or cutout portions 5 therein, the cutout notch portions in each bar being aligned with similar cutout portions in other bars and the walls of said cutout portions 5 serve to receive the roost arms 6 which detachably seat within said sockets and upon which the chickens roost when the apparatus is in use. It will be seen that these roost arms are not permanently attached to the supporting sides and can be easily lifted from their operative position. It will also be appreciated that these roost arms 6 serve to space the upper ends of the rectangular side frames 1 and 2 when the nuts on the tie rods are adjusted to draw said frames toward each other.

To provide a means for the chickens to reach the roost arms 6, I have provided a ladder 7 which is of an elongated formation and has notches 7' in the upper ends of the sides of the ladder which fit over one of the roost bars 6 for supporting the ladder in place. It will be seen that the chickens can easily climb or walk over the ladder and reach the roost bar 6 upon which they roost.

Positioned between the sides 1 and 2 is a movable tray 8', the same having suitable supporting wheels 9 and this tray is adapted to be placed beneath the roost bars 6 when the roost is in use and constitutes a receiver for droppings. The tray is provided with a handle 10, so that the same can be freely removed from beneath the roost for the purpose of cleaning from time to time, the sides of the frames 1 and 2 constituting a guide for the tray; it will therefore be appreciated that when the tray is in its normal position it engages the side frames and therefore serves to hold said frames separated at the bottom thereof. When the device is not in use the same can be easily knocked down by the removal of the tie rods and the parts folded so that little or no space is occupied.

Having thus described my invention, what I claim is:

A knock-down roost, comprising frame members of substantially rectangular formation, having open interiors, tie rods for uniting a pair of said frame members and for holding the same against separation, the upper portions of said frame members being formed with a plurality of spaced notches extending partially therethrough from the inner sides of said frame members, said notches in said frame members being in axial alignment, removable roost rods supported by said frame members and entering the notches therein, said roost rods serving to space the frame members apart at their upper ends, a removable element leading from a supporting surface to one of said roost rods and a removable tray positioned between said frame members and slidably engaging the same, said tray when in a normal position serving to separate the side members at their lower ends.

In testimony whereof I affix my signature.

NAOMI EGAN.